UNITED STATES PATENT OFFICE.

HERMANN MEHNER, OF VELTEN, GERMANY.

PROCESS OF MAKING PHOSPHATIC SLAG AND IRON.

977,819.	Specification of Letters Patent.	Patented Dec. 6, 1910.

No Drawing.	Application filed May 17, 1910. Serial No. 561,872.

*To all whom it may concern:*

Be it known that I, HERMANN MEHNER, a citizen of the German Empire, and resident of Velten-in-the-Mark, Germany, chemist, have invented certain new and useful Improvements in Processes of Making Phosphatic Slag and Iron, of which the following is a specification.

My invention relates to a process of manufacturing phosphoric compounds suitable for use as fertilizers, and iron, preferably by running a blast-furnace with phosphate slags instead of with silicate slags. In practicing this preferred embodiment of my invention, I heat iron ores in a blast-furnace together with tricalcium-phosphate or compounds in such proportion that a slag rich in tetra-calcium phosphate is formed, and separate the manure-forming slag from the iron phosphid, or iron rich in phosphid, and thereafter treat the iron material in a suitable furnace with iron oxygen compounds, in presence of basic additions, and again separate the slag from the metal, this slag also being suitable for manuring purposes. In this process, a part of the phosphoric acid contained in the tricalcium-phosphate is reduced under the conditions existing in the blast-furnace, so that a slag containing tetra-calcium phosphate is formed at the same time with iron phosphid or iron rich in iron phosphid. The iron phosphid contains latent heat in the form of chemical energy and may be used for carrying out heat-requiring processes. Especially may such chemical energy be advantageously used for reducing iron-oxygen compounds in suitable, preferably open hearth furnaces, as above-mentioned with addition of suitable basic materials. As a basic material, for instance, lime may be used, in which case a slag is formed which is rich in tetra-calcium phosphate. In order to obtain a slag in which the content of tetra-calcium phosphate is as high as possible, it is advisable to make the required addition of lime in two portions. In this instance the first portion of lime results in the formation of a slag which is very rich in tetra-calcium phosphate. This slag may be drawn off before a further portion of lime is added. The slag formed from the further portion of lime becomes less rich in phosphate of calcium and may be used as addition to the ore introduced into the blast-furnace. Instead of lime, burnt dolomite or magnesite may be used.

The combination of the above described blast-furnace process with the open hearth-furnace process results in a very economical method of reducing iron ores.

As to the relative proportions of the materials to be treated, the reactions which take place must be considered. These reactions occurring in the blast-furnace can be seen from the following equations, assuming that chemically pure substances are used and that an iron ore is to be treated which from a chemical point of view consists of $Fe_3O_4$:—

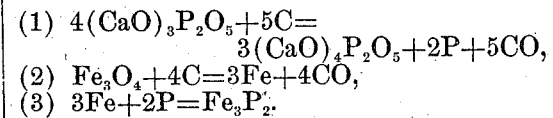

(1) $4(CaO)_3P_2O_5 + 5C = 3(CaO)_4P_2O_5 + 2P + 5CO$,
(2) $Fe_3O_4 + 4C = 3Fe + 4CO$,
(3) $3Fe + 2P = Fe_3P_2$.

These three different reactions practically occur simultaneously. From these equations it appears that, for every 232 pounds of $Fe_3O_4$ contained in the iron ore to be treated, 1240 pounds of $4(CaO)_3P_2O_5$ may be taken, together with a quantity of carbon sufficient for reduction. The reduction can practically be effected with less carbon than conforms to the above equations, because the carbon oxid (CO) acts likewise as a reducing agent. Of course more or less iron ore may be taken according to the degree of phosphorization of the iron which is to be obtained. Further, greater or less amounts of silica and impurities enter the blast-furnace with the ores and other materials, which are not shown by the equations.

Relative to the treatment of the iron phosphid produced by the new blast-furnace process: The reactions taking place may be seen from the following equation, given as an example, and the proportions of the materials may be calculated therefrom:

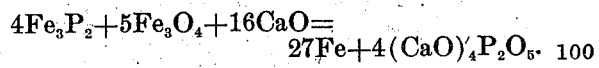

$4Fe_3P_2 + 5Fe_3O_4 + 16CaO = 27Fe + 4(CaO)_4P_2O_5$.

In order to abstract from the iron phosphid the whole of the phosphorus contained therein, it is practically necessary to use an excess of lime at the end of the process. Therefore this process may be carried out as above stated in such way that at first only the greater part of the phosphorus is removed from the iron phosphid by a comparatively small amount of lime, and thereafter the last portion by a comparatively great amount of lime. The amount of phosphorus in the first and second slags largely depends on the greater or less richness of the materials and on the skill of the worker and manager.

Instead of converting the tricalcium-phosphate into the tetra-calcium phosphate by using it as addition to iron ores in a blast-furnace, the phosphoric acid in the tricalcium-phosphate may be reduced by treating the phosphate with reducing agents in presence of ores of other metals than iron, or with free metals of suitable kind, either in a blast-furnace or in other suitable furnaces or ovens. Eventually the reducing action may be effected without a phosphorus binding re-agent being present. Furthermore, the iron phosphid obtained by the reduction of phosphoric acid contained in phosphates in the presence of free or chemically bound iron may be used, not only in an open hearth process for reducing iron ores but also used for recovering scrap-iron, which may be melted in considerable quantities by comparatively small quantities of iron phosphid, on account of the latent energy accumulated therein.

What I claim is:

1. In the process of manufacturing a phosphatic-slag fertilizer, the improvement which comprises treating tricalcium-phosphate-containing material so as to reduce a part of the phosphoric acid contained therein and form a phosphatic slag consisting substantially of tetra-calcium phosphate, and separating the product of the phosphoric-acid-reduction from the fertilizer-forming residue.

2. In the process of manufacturing a phosphatic-slag fertilizer, the improvement which comprises heating tricalcium-phosphate-containing material in presence of carbon so as to partially dephosphorize the phosphate and convert it into a phosphate slag consisting substantially of tetra-calcium phosphate.

3. In the process of manufacturing a phosphatic-slag fertilizer, the improvement which comprises treating tricalcium-phosphate-containing material in presence of carbon and a metal-containing material, so as to reduce a part of the phosphoric acid contained in said tricalcium-phosphate-containing material, forming thereby a phosphatic slag consisting substantially of tetra-calcium phosphate, and binding the freed phosphorus to the metal, and separating the slag from the phosphorus-containing metal.

4. In the process of manufacturing a phosphatic-slag fertilizer, the improvement which comprises treating tricalcium-phosphate-containing material in presence of carbon and iron so as to reduce a part of the phosphoric acid contained in said tricalcium-phosphate-containing material, forming thereby a phosphatic slag consisting substantially of tetra-calcium phosphate, and separating the same from the formed iron-phosphorus compound.

5. In the process of manufacturing a phosphatic-slag fertilizer, the improvement which comprises heating tricalcium-phosphate-containing material in admixture with metallic ores and carbon so as to partly dephosphorize the tricalcium-phosphate material, forming thereby from the phosphate a phosphatic slag consisting substantially of tetra-calcium phosphate, and separating the same from the product of reduction of the metallic ores.

6. In the process of manufacturing a phosphatic-slag fertilizer, the improvement which comprises heating tricalcium-phosphate-containing material in admixture with iron ores and carbon so as to partly dephosphorize the tricalcium-phosphate material, forming thereby from the phosphate a phosphatic slag consisting substantially of tetra-calcium phosphate, and separating the same from the product of reduction of the iron ores.

7. The process of making phosphatic slag and iron, which consists in heating tricalcium-phosphate-containing material in admixture with iron ores and carbon so as to partly dephosphorize the phosphate, forming thereby a fertilizer slag, separating said slag from the iron-phosphid-containing material resulting from the reaction of the heated substances, treating said phosphid-containing material with iron-oxygen compounds in presence of basic material, and separating the iron resulting from such procedure from the fertilizer slag.

In testimony whereof, I affix my signature in presence of two witnesses.

HERMANN MEHNER.

Witnesses:
HENRY HASPER,
WOLDEMAR HAUPT.